(12) United States Patent
Qi et al.

(10) Patent No.: US 9,247,176 B2
(45) Date of Patent: Jan. 26, 2016

(54) REMOTE CONTROL AND TELEVISION SYSTEM

(75) Inventors: Hongtao Qi, Qingdao (CN); Guorui Chen, Qingdao (CN); Yilong Chen, Qingdao (CN); Weitao Yuan, Qingdao (CN)

(73) Assignees: Haier Group Corporation, Qingdao (CN); Qingdao Haier Electronics Co., Ltd., Qingdao (CN)

( * ) Notice: Subject to any disclaimer, the term of this patent is extended or adjusted under 35 U.S.C. 154(b) by 136 days.

(21) Appl. No.: 14/005,241

(22) PCT Filed: Jul. 18, 2011

(86) PCT No.: PCT/CN2011/077269
§ 371 (c)(1),
(2), (4) Date: Sep. 13, 2013

(87) PCT Pub. No.: WO2012/126225
PCT Pub. Date: Sep. 27, 2012

(65) Prior Publication Data
US 2014/0002754 A1 Jan. 2, 2014

(30) Foreign Application Priority Data
Mar. 21, 2011 (CN) ...................... 2011 2 0074496 U

(51) Int. Cl.
*H04N 5/44* (2011.01)
*H04N 21/422* (2011.01)

(52) U.S. Cl.
CPC ......... *H04N 5/4403* (2013.01); *H04N 21/4221* (2013.01); *H04N 21/42212* (2013.01); *H04N 21/42222* (2013.01)

(58) Field of Classification Search
CPC .......... H04N 21/4222; H04N 21/4221; H04N 21/42212; H04N 5/4403; H04N 2005/4432; H04N 1/00403
USPC ............... 340/12.54, 12.5; 341/176; 348/734; 704/275, 246; 367/198; 381/110
See application file for complete search history.

(56) References Cited

U.S. PATENT DOCUMENTS 5,199,080 A * 3/1993 Kimura et al. ................ 381/110
5,686,887 A * 11/1997 Chen et al. ................ 340/539.19
(Continued)

FOREIGN PATENT DOCUMENTS

| CN | 2518278 Y | 10/2002 |
| CN | 2927212 Y | 7/2007 |

(Continued)

OTHER PUBLICATIONS

ISA/CN, International Search Report for Int'l Application No. PCT/CN2011/077269, Sep. 8, 2011, 4 pp.

*Primary Examiner* — Edwin Holloway, III
(74) *Attorney, Agent, or Firm* — Fish & Tsang, LLP

(57) ABSTRACT

Provided is a remote control comprising a housing, a keyboard (20) mounted on the housing, a processor (106) electrically connected to the keyboard (20), an analog-digital converter (103) and a high-frequency wireless transmission unit (108) electrically connected to the processor (106), a sampling circuit (102) electrically connected to the analog-digital converter (103) and a microphone interface (30) electrically connected to the sampling circuit (102). Also disclosed is a television system. The remote control and television system in the present solution are simple to operate and can satisfy user's multi-function requirements.

9 Claims, 3 Drawing Sheets

(56) References Cited

U.S. PATENT DOCUMENTS

| | | |
|---|---|---|
| 5,982,853 A | 11/1999 | Liebermann |
| 6,633,235 B1 | 10/2003 | Hsu et al. |
| 2002/0069063 A1 | 6/2002 | Buchner et al. |
| 2006/0028337 A1* | 2/2006 | Li ............................. 340/539.1 |
| 2007/0277215 A1* | 11/2007 | Allen et al. ................... 725/131 |
| 2010/0082351 A1* | 4/2010 | Lee .............................. 704/275 |
| 2011/0119715 A1* | 5/2011 | Chang et al. .................... 725/53 |

FOREIGN PATENT DOCUMENTS

| | | |
|---|---|---|
| JP | 2005292693 A | 10/2005 |
| WO | 2001-82789 A2 | 11/2001 |
| WO | 2001-97211 A2 | 12/2001 |

* cited by examiner

REMOTE CONTROL AND TELEVISION SYSTEM

BACKGROUND OF THE INVENTION

The present invention relates to a technical field about television remote control, especially a remote control and a television system.

DESCRIPTION OF THE RELATED ART

As the development of the modern scientific technology, home appliances, such as television, are gradually popularized. People usually use the television for knowing the external information and learning. The television has been an indispensable part of people's life. In order to facilitate the various television operations for user without going to the adjacency of the television, the remote control for television had been born at the right moment.

The conventional remote control for television normally comprises a housing, a keyboard mounted on the housing and a processor mounted inside of the housing. This kind of remote control only has some functions, such as power switch on/off, television-viewing, menu set, adjustment of sound volume and programs, which are too simple to satisfy the multiple requirements of user. In daily life, when user needs to watch TV simultaneously does something else, the hands of user are often unavailable to operate the keyboard of the remote control. In addition, it is difficult to find corresponding the keys on the keyboard for user when the surrounding circumstance is darker or the vision of the user is bad, leading to wrong key press and inconvenient operation.

SUMMARY OF THE INVENTION

The purpose of the present invention is to provide an easily operational and multifunctional remote control and a television system.

Therefore, the present invention provides a remote control comprising a housing, a keyboard mounted on said housing, a processor electrically connected with said keyboard, an analog-digital converter and a high-frequency wireless transmission unit which are electrically connected with said processor, a sampling circuit electrically connected with said analog-digital converter, and a microphone interface electrically connected with said sampling circuit.

In an embodiment of the present invention, said remote control further comprises a memory electrically connected with said processor.

In an embodiment of the present invention, said remote control comprises a wireless network processing chip electrically connected with said processor.

In an embodiment of the present invention, said remote control further comprises a mode switching circuit electrically with said processor.

In an embodiment of the present invention, said mode switching circuit comprises a pull-up resistor and a switch, two ends of the pull-up resistor are electrically connected with a power supply and an input end of the processor respectively; one end of the switch is electrically connected with the input end of the processor, the other end is connected to the ground.

In an embodiment of the present invention, said remote control further comprises an indicator electrically connected with said processor.

In an embodiment of the present invention, said indicator comprises an indicator light.

In an embodiment of the present invention, said keyboard is further provided with a mode switching key which is mounted above said switch.

In an embodiment of the present invention, said high-frequency wireless transmission unit is a 2.4 G wireless transmission unit.

The embodiment of the present invention further provides a television system comprising said remote control and a television; a high-frequency wireless transmission unit, a memory and a processor are disposed inside of said television; said processor is electrically connected with said high-frequency wireless transmission unit and said memory.

The remote control according to the present invention is integrated with the microphone interface, the memory, the sampling circuit, the analog-digital converter and the high-frequency wireless transmission unit. The television is integrated with the high-frequency wireless transmission unit, the memory and the processor so that the user only need speak to the microphone to achieve the control for television. The remote control is further integrated with a wireless network processing chip so as to display the user speaking content on the screen of the television. The remote control is further integrated with an indicator, a mode switching key and a mode switching circuit, so that the remote working mode may be indicated. The present invention integrates the voice control function, the voice recognition function and the mode switching function to the remote control so as to apply these functions to the television corresponding to the remote control, and thus the present invention may further satisfy the requirements of user with respect to the remote control and the multi-functions of the television, and be convenient for user.

| Numerals description for major elements | |
|---|---|
| 2: remote control | 5: television |
| 10: housing | 20: keyboard |
| 30: microphone interface | 40: indicator |
| 102: sampling circuit | 103: analog-digital converter |
| 106, 505: processor | 108, 502: high-frequency wireless transmission unit |
| 110, 503: memory | 112: mode switching circuit |
| 113: wireless network processing chip | 202: mode switching key |
| 401: green light | 403: red light |
| Vcc: power supply | K: switch |

DETAILED DESCRIPTION OF THE INVENTION

In order to further explain the technical solution used by the present invention for achieving the predetermined purpose and effect, the embodiment, structure, features and effects of the remote control and the television system according to the present invention will be described in accompany with the drawings and proper examples. More details are as follows:

The above-mentioned and other technical contents, features and effects of the present invention, will be clearly presented in the following detailed description of the proper embodiment coordinating with the drawings. The technical means and effects adopted to achieve the purpose will be understood deeply and specifically through the description for the embodiment. The drawings are only used for providing reference and description, not for limiting the present invention.

Figure 1:
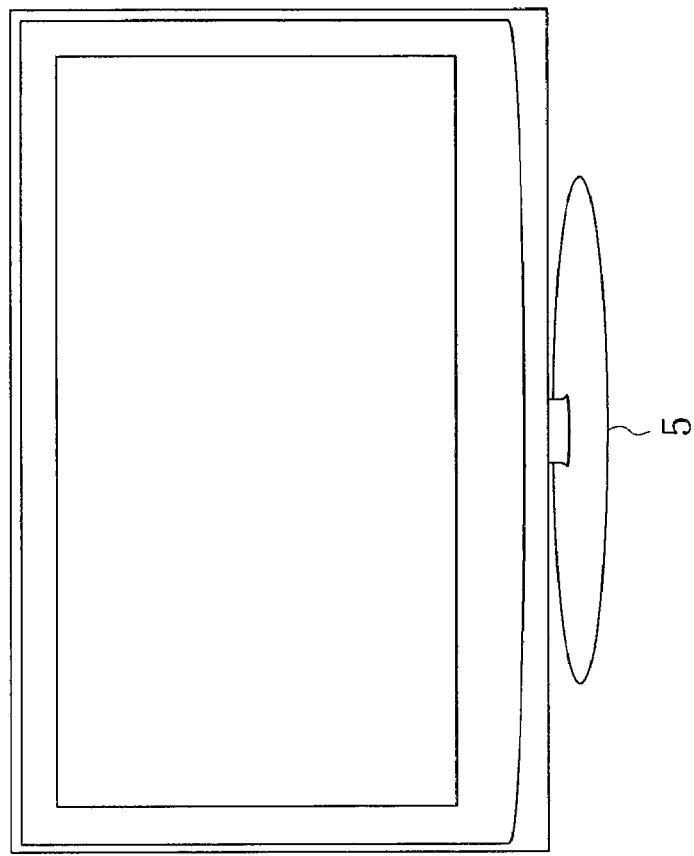
FIG. 1 is a schematic view of the television system according to an embodiment of the present invention.
Figure 1:
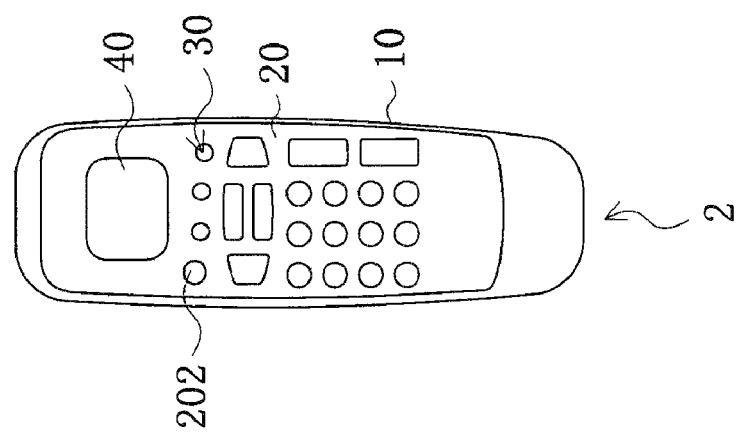
Figure 2:
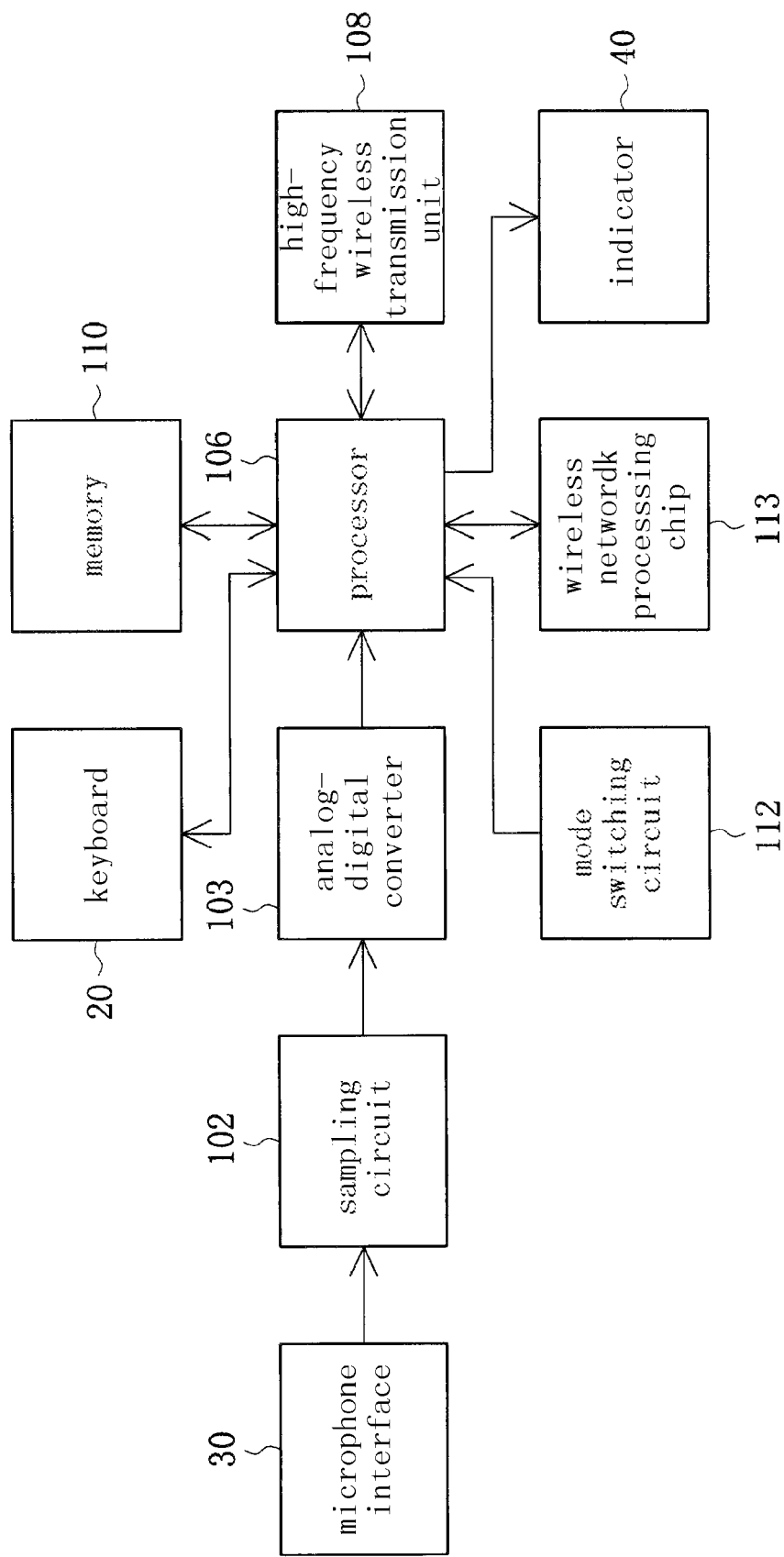
FIG. 2 is a structure block diagram of the remote control according to an embodiment of the present invention.
Figure 3:
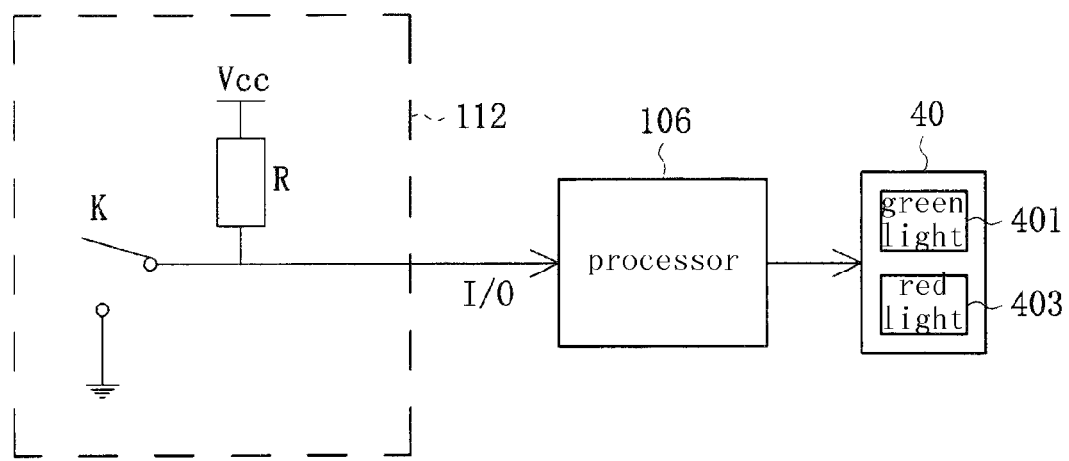
FIG. 3 is a block diagram in which the mode switching circuit, processor and indicator in the FIG. 1 are connected successively.
Figure 4:
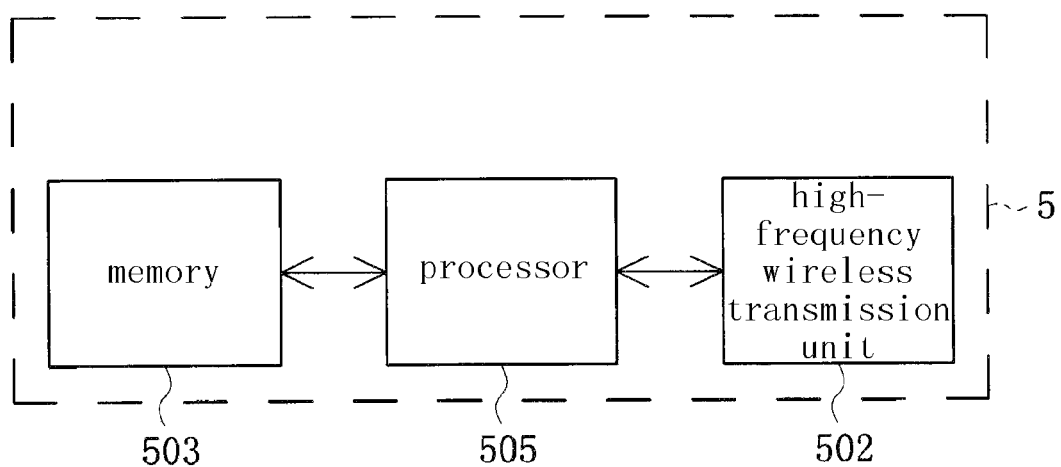
FIG. 4 is a structure block diagram of the television in the FIG. 1.

FIG. 1 is a schematic view of the television system according to an embodiment of the present invention. FIG. 2 is a structure block diagram of the remote control according to an embodiment of the present invention. FIG. 3 is a block diagram in which the mode switching circuit, processor and indicator in the FIG. 1 are connected successively. FIG. 4 is a structure block diagram of the television in the FIG. 1.

As FIGS. 1 to 4 shown, the television system according to the present invention comprises a remote control 2 and a television 5. The remote control 2 comprises a housing 10, a keyboard mounted on the housing 10, a microphone interface 30, a sampling circuit 102 mounted inside of the housing 10, an analog-digital converter 103, a processor 106 and a high-frequency wireless transmission unit 108. The remote control 2 further comprises an indicator 40 disposed on the housing 10 and a memory 110, a mode switching circuit and a wireless network processing chip 113 which are mounted inside of the housing.

The remote control 2 is connected to the television 5 for communicating through the high-frequency wireless transmission unit 108, so that the remote control 2 converts the voice command corresponding to the user speaking content to a television control instruction and transmits the television control instruction to the television 5 via the high-frequency wireless transmission unit 108, when the user speaks to the microphone interface 30 of the remote control 2.

The keyboard 20 is electrically connected with the processor 106, and provided with plurality of keys including all the keys on the conventional television remote control, such as sound volume adjustment keys, program selection keys, menu setting keys and etc. The keyboard 20 is further provided with a mode switching key 202 for controlling the remote control 2 in different working modes. In this embodiment, the working modes include a voice control mode and a voice recognition mode. When the remote control 2 is in the voice control mode, if the user says something, such as "channel pluses 1", to the microphone interface 30, the sampling circuit 102, the analog-digital converter 103 and the processor 106 will process a voice command corresponding to the speaking content in turn and then send the processed voice command to the television 5 via the high-frequency wireless transmission unit 18 so that the television implements corresponding operation, for example, the current program presented on the television is switched to the next. When the remote control 2 is in the voice recognition mode which is used for mainly satisfying the user requirement for network communicating function or other functions requesting the conversion of voice and word, for example, the use may select this mode to edit document, chat online and etc. The voice recognition mode is capable of converting a voice command corresponding to the user speaking content to the word information displaying on the screen of the television 5, that is, if a user says something, such as "hello", to the microphone interface 30, the sampling circuit 102 and the analog-digital converter 103 will convert a voice command corresponding to the speaking content in turn to a digital signal by relevant processing and then send the digital signal to the processor 106. The processor 106 receives the digital signal outputting from the analog-digital converter 103 to control the wireless network processing chip 113 to online search word signal corresponding to the digital signal, and convert the searched word signal to the corresponding television control instruction, then send the television control instruction to the television 5 via the high-frequency wireless transmission unit 108 so that the television 5 implements corresponding operation, for example, displaying "Hello" on the screen of the television 5. In other embodiments, the different working modes of the remote control 2 may be set on the basis of the actual requirement.

The indicator 40 is electrically connected with the processor 106 and adopted to indicate which working mode the remote control 2 is in, for example, indicating that the remote control 2 is in the voice control mode or the voice recognition mode. In this embodiment, the indicator comprises indicating lights, such as a green light 401, a red light 403. For an instance, the green light 401 shines for indicating that the remote control 2 is working in the voice control mode; the red light 403 shines for indicating that the remote control 2 is working in the voice recognition mode. In other embodiments, the types and indicating ways of the indicator 40 may be set on the basis of the actual requirement.

The microphone interface 30 is electrically connected with the sampling circuit 102 and adopted to receive voice command corresponding to the user speaking content and send audio signal corresponding to this voice command to the sampling circuit 102.

The sampling circuit 102 is electrically connected with the microphone interface 30 and the analog-digital converter 103 and adopted to receive an audio signal input by the microphone 30 and sample, amplify, quantize the audio signal and then send the quantized audio analog signal to the analog-digital converter 103.

The analog-digital converter 103 is electrically connected with the sampling circuit 102 and the processor 106, and adopted to receive the quantized audio analog signal sent by the sampling circuit 102 and convert the quantized audio analog signal to a digital signal, then send the digital signal to the processor 106.

The memory 110 is electrically connected with the processor 106 and pre-stores control information, for example, the control information is a comparing table which compares the television control instructions sent to the high-frequency wireless transmission unit 108 to the digital signals output by the analog-digital converter 103. The comparing table may include a certain television control instruction corresponding to several digital signals, for example, the digital signal corresponding to the user speaking contents, such as "channel 1", "No. 1 channel", "the first channel", may be set to be a control instruction which switches the current channel of the television to the first channel. There is a voice difference between different users, the digital signal corresponding to the mandarin, regional dialect or foreign language which expresses the same meaning, may be correspondingly set to be the same television control instruction on the basis of the actual requirement. Furthermore, the user may pre-set the content of the comparing table on the basis of the actual requirement. In other embodiments, the memory 110 may be omitted on the basis of the actual requirement, and the digital signal output by the analog-digital converter 103 may be analyzed directly through the processor 106.

The processor 106 is electrically connected with the keyboard 20, the indicator 40, the analog-digital converter 103, the mode switching circuit 112, the high-frequency wireless transmission unit 108, the wireless network processing chip 113 and the memory 110. The processor 106 is adopted to receive a corresponding signal output by the keyboard 20 and encode the signal to a television control instruction, then send the instruction to the high-frequency wireless transmission unit 108. The processor 106 is further adopted to receive a control signal output by the mode switching circuit 112 and process the control signal, then send the processed control signal to the indicator 40 so that the indicator 40 may indicate the working mode of the remote control 2. The processor 106 is further adopted to receive the digital signal output by the analog-digital converter 103 in the voice recognition mode of the remote control 2 and control the wireless network processing chip 113 to search word signal corresponding to the digital signal on line, then convert the word signal to a relevant television control instruction and send the television control instruction to the high-frequency wireless transmission unit 108. The processor 106 is further adopted to receive the digital signal output by the analog-digital converter 103 in the voice control mode of the remote control 2 and read the control information stored in the memory 110, then compare the control information to the digital signal output by the analog-digital converter 103, after that, choose a relevant television control instruction corresponding to the digital signal from the control information and then send this television control instruction to the high-frequency wireless transmission unit 108. In this embodiment, the processor 106 may be a MCU (Micro Control Unit).

The wireless processing chip 113 is electrically connected with the processor 106 and adopted to receive the digital signal output by the processor 106 in the voice recognition mode of the remote control 2, and wirelessly access the network and search the word signal corresponding to the digital signal in the network voice library, then send the word signal to the processor 106.

The mode switching circuit 112 is electrically connected with the processor 106 and comprises a pull-up resistor R and a switch K. Two ends of the pull-up resistor R are electrically connected with a power supply Vcc and an input end I/O of the processor 106 respectively. One end of the switch K is electrically connected with the input end I/O of the processor 106, the other end is connected to the ground. A mode switching key 202 is provided above the switch K. The switch K is opened normally. The input end I/O of the processor 106 receives a control signal output by the mode switching circuit 112 so that the processor 105 outputs an indicating signal, for example outputting a high-level instructing signal to the green light 401 of the indicator so as to light the green light 401 of the indicator 40, which means that the remote control 2 is working in the voice control mode. When the user presses the mode switching key 202 on the keyboard 20, the switch K is closed instantly; the input end I/O of the processor 106 receives a control signal output by the mode switching circuit 112 so that the processor 106 outputs an indicating signal, for example, outputs a high-level indicating signal to the red light 403 of the indicator 40 to light the red light 403 of the indicator 40, which means that the remote control 2 is working in the voice recognition mode. In other embodiments, the processor 106 may be set to output different indicating signal on the basis of the difference of the indicator 40.

The high-frequency wireless transmission unit 108 is electrically connected with the processor 106 and adopted to receive the television control instruction transmitted by the processor 106 and send the television control instruction to the television 5. The television control instruction includes a specific component of the remote control 2 which sends out the control instruction, the type of the instruction and etc, such as an instruction corresponding to the user speaking content "channel 1" or "Hello" which is said to the microphone 30. In this embodiment, the high-frequency wireless transmission unit 108 is a 2.4G wireless transmission unit so as to insure the higher transmission speed and efficiency for the signal. In other embodiments, the high-frequency wireless transmission unit 108 may be other types of high-frequency wireless transmission unit.

The television 5 comprises a high-frequency wireless transmission unit 502, a memory 503 and a processor 505 which are disposed inside of the television 5.

The high-frequency wireless transmission 502 is electrically connected with the processor 505 and adopted to receive a television control instruction transmitted by the high-frequency wireless transmission unit 108 of the remote control 2 in real time, and send the television control instruction to the processor 505. In this embodiment, the high-frequency wireless transmission unit 502 is a 2.4G wireless transmission unit. In other embodiments, the high-frequency wireless transmission unit 502 may be other types of high-frequency wireless transmission unit.

The memory 503 is electrically connected with the processor 505 and pre-stores a comparing table of the television control instructions and the word library. For example, this comparing table may include such content in which a certain television control instruction corresponds to word information in the word library. For an instance, a television control instruction corresponding to the user speaking content "Hello" may be set to correspond to the "Hello" in the word library. In addition, the user may preset the content of the comparing table on the basis of the actual requirement.

The processor 505 is electrically connected with the high-frequency wireless transmission unit 502 and the memory 503 and adopted to decode the received television control instruction transmitted by the high-frequency wireless transmission unit 502 in the voice control mode of the remote control 2, and control the television 5 to implement relevant operation on the basis of the encoded television control instruction. The processor 505 is further adopted to decode the received television control instruction transmitted by the high-frequency wireless transmission unit 502 in the voice recognition mode of the remote control 2, and read the comparing table stored in the memory 503, then compare the comparing table to the decoded television control instruction, choose the word information corresponding to the decoded television control instruction from the comparing tale and display this word information on the screen of the television 5.

Hereinafter, the interaction between the remote control 2 and the television 5 will be described in details by an example.

The switch K is normally opened. The mode switching circuit 112 controls the processor 106 to output a high-level indicating signal to the green light 401 of the indicator 40 so that the green light 401 of the indicator 40 shines for indicating that the remote control 2 is working in the voice control mode. The user says to the microphone interface 30, such as "channel 12", the sampling circuit 102 samples, amplifies and quantizes the voice command corresponding to the user speaking content, after that the voice command is converted to a quantized audio analog signal, and then the analog-digital converter 103 converts the quantized audio analog signal to a digital signal and sends the digital signal to the processor 106. The processor 106 compares the digital signal to the control information pre-stored in the memory 110 to find out the comparing information with the highest similarity, after that choose a television control instruction corresponding to this digital signal from the comparing information with the highest similarity. For example, a control instruction which changes the current program played by the television 5 to the channel 12 is sent to the television 5 via the high-frequency wireless transmission unit 108. The high-frequency wireless transmission unit 502 of the television 5 receives the television control instruction sent by the high-frequency wireless transmission unit 108 of the remote control 2. The processor 505 decodes the television control instruction and controls the television 5 to implement relevant operation on the basis of the decoded television control instruction; for example, the current program played by the television 5 is changed to is the channel 12.

When the user press the mode switching key 202 on the keyboard 20, the switch K is closed instantly. The mode switching circuit 112 controls the processor 106 to output a high-level indicating signal to the red light 403 of the indicator 40 so that the red light 403 of the indicator 40 shines, which means that the remote control 2 is working in the voice recognition mode. This mode is normally used when the user edits document, chats online and does some operations like that. At this moment, if the user speaks to the microphone 30, such as "who are you", the sampling circuit 102 will sample, amplify and quantize the voice command corresponding to the user speaking content, after that the voice command is converted to a quantized audio analog signal, and then the analog-digital converter 103 converts the quantized audio analog signal to a digital signal and sends the digital signal to the processor 106. The processor 106 receives the digital signal output by the analog-digital converter 103 and controls the wireless network processing chip 113 to search the word signal corresponding to the digital signal on line, such as the word signal of "who are you" corresponding to the digital signal "who are you", and then converts the word signal to the television control instruction and sends the television control instruction to the television 5 via the high-frequency wireless transmission 108. The processor 505 of the television 5 decodes the television control instruction transmitted by the high-frequency wireless transmission 502, and reads the comparing table stored in the memory 503 to compare the table to the decoded television control instruction, after that chooses a word information corresponding to the decoded television control instruction from the comparing table and displays the word information on the screen of the television 5, for example, displays "who are you" on the screen of the television 5. The displayed word information is amendable. For the word which need to be amended, the conventional keys on the remote control 2 can be used, such as "up", "down", "left", "right" keys, to put the cursor behind that word, at this time the words similar to the word (current word) which need to be amended may be displayed on the screen of the television 5 and may be selected by the remote control 2 to replace the current word. After the sentence being confirmed by the user finally, the "send" or "confirm" is selected so as to achieve the functions of online chat, document edit or words display on the input window of search engine or other input windows.

In conclusion, according to the embodiment of the present invention, the remote control 2 is integrated with the microphone interface 30, the memory 110 storing the control information, the sampling circuit 102, the analog-digital converter 103 and the high-frequency wireless transmission unit 108. The television 5 is integrated with the high-frequency wireless transmission unit 502, the memory 502 and the processor 505 so that the remote control 2 is not only capable of remote control function for normal television, but also capable of converting the user speaking content corresponding to the voice command to the digital signal by using the sampling circuit 102 and the analog-digital converter 103 and sending the digital signal to the processor 106. The processor 106 compares the digital signal to the control information pre-stored in the memory 110 to find out the television control instruction corresponding to the digital signal, after that sends the television control instruction to the television 5 via the high-frequency wireless transmission unit 108, and then decodes the television control instruction by the processor 505 of the television 5 and controls the television 5 to implement relevant operation on the basis of decoded television control instruction, so as to achieve the voice control function of the television 5. In this way, the user hands may be liberated to do other things when the user needs to watch TV and work at other things simultaneously. In the darkness environment or bad vision the user has, the user only needs to speak to the microphone interface 30 as well to achieve control for the television. If the channel needs to be switched to the fifth, the user may directly say "No. 5 channel", "channel 5" or "the fifth channel" and etc to the microphone interface 30, the television 5 will switch the program to the fifth automatically, so that the operation becomes very convenient.

The remote control 2 is also integrated with the wireless network processing chip 113. After receiving the digital signal output by the analog-digital converter 103, the processor 106 may control the wireless network processing chip 113 to search the word signal corresponding to the digital signal on line, and then converts the word signal to a television control instruction and sends the television control instruction to the television 5 via the high-frequency wireless transmission unit 108. After that, the processor 505 of the television 5 decodes the received television control instruction transmitted by the high-frequency wireless transmission unit 502 and reads the comparing table stored in the memory 503, after comparing the table and the television control instruction, the processor 505 chooses word information corresponding to the decoded television control instruction from the comparing table and displays the word information on the screen of the television 5 so as to achieve the function of voice recognition of the television 5. For example, when the user edits document, chats on line and does something like that, the user says the content to be searched, the remote control 2 may find out word information via searching engine and display the word information on the screen of the television 5.

The remote control 2 is further provided with the indicator 40, the mode switching key 202 and the mode switching circuit 112. The processor 106 may output indicating signal to the indicator by user's pressing the mode switching key 202 on the keyboard 20, the indicator 40 indicates that the remote control 2 is working in the voice control mode or the voice recognition mode.

Briefly, the present invention integrates the voice control function, the voice recognition function and the mode switching function to the remote control 2 so as to apply these functions to the television 5 corresponding to the remote control 2, and thus the present invention may further satisfy the requirements of user with respect to the remote control 2 and the multi-functions of the television 5, and be convenient for user.

The above description is only the proper embodiment of the present invention, and not used to limit the present invention in form. Although the present invention has been disclosed by the above embodiments, the above embodiments are not used to limit the present invention. Any person skilled in the art may amend or modify the contents disclosed by the above description to make equivalent embodiments without breaking away from the technical solution range of the present invention. In a word, any amendments, alternatively replacement, improvement and etc made under the essences and principles of the present invention, should be included within the protection range of the present invention without exception.

The invention claimed is:

1. A remote control comprising:
   a housing;
   a keyboard mounted on the housing;
   a processor electrically connected with the keyboard;
   a memory electrically connected to the processor and configured to store corresponding relationships between digital signals and control instructions;
   a microphone interface configured to receive an analog voice command;
   a sampling circuit and an analog-digital converter electrically connected with the processor and the microphone interface, and configured to covert the analog voice command to a digital signal; and
   an ultra-high frequency wireless transmission unit electrically connected with the processor,
   wherein the processor is configured to:
      correspond the digital signal to a control instruction according to the corresponding relationships stored in the memory and send out the control instruction via the ultra-high frequency wireless transmission unit when the remote control is in a voice control operation mode, and
      recognize, via a voice recognition engine, the digital signal as a word from a human language and send out the word via the ultra-high frequency wireless transmission unit when the remote control is in a voice recognition operation mode.

2. The remote control of claim 1, further comprising a wireless network processing chip electrically connected with the processor, the processor further configured to access a network via the wireless network processing chip to recognize the word corresponding to the digital signal when the remote control is in the voice recognition operation mode.

3. The remote control of claim 1, further comprising a mode switching circuit electrically connected with the processor and configured to switch the processor between the voice control operation mode and the voice recognition operation mode.

4. The remote control of claim 3, wherein the mode switching circuit comprises a pull-up resistor and a switch, wherein two ends of the pull-up resistor are electrically connected with a power supply and an input end of the processor, respectively, wherein one end of the switch is electrically connected with the input end of the processor and the other end of the switch is connected to the ground.

5. The remote control of claim 4, further comprising an indicator electrically connected with the processor.

6. The remote control of claim 5, wherein the indicator comprises an indicator light.

7. The remote control of claim 4, wherein the keyboard is further provided with a mode switching key which is mounted above the switch.

8. The of claim 1, wherein the ultra-high frequency wireless transmission unit is a 2.4 G wireless transmission unit.

9. A television system comprising:
   a television comprising:
      a first ultra-high frequency wireless transmission unit,
      a first memory, and
      a first processor disposed inside of the television and electrically connected with the first ultra-high frequency wireless transmission unit and the first memory; and
   a remote control comprising:
      a second processor,
      a second memory electrically connected to the second processor and configured to store corresponding relationships between digital signals and control instructions,
      a microphone interface configured to receive an analog voice command,
      a sampling circuit and an analog-digital converter electrically connected with the second processor and the microphone interface, and configured to covert the analog voice command to a digital signal, and
      a second ultra-high frequency wireless transmission unit electrically connected with the second processor,
      wherein the second processor is configured to:
         correspond the digital signal to a control instruction according to the corresponding relationships stored in the memory and send the control instruction to the television via the second ultra-high frequency wireless transmission unit when the remote control is in a voice control operation mode, and
         recognize, via a voice recognition engine, the digital signal as a word from a human language and send the word to the television via the second ultra-high frequency wireless transmission unit when the remote control is in a voice recognition operation mode.

* * * * *